Patented Nov. 7, 1922.

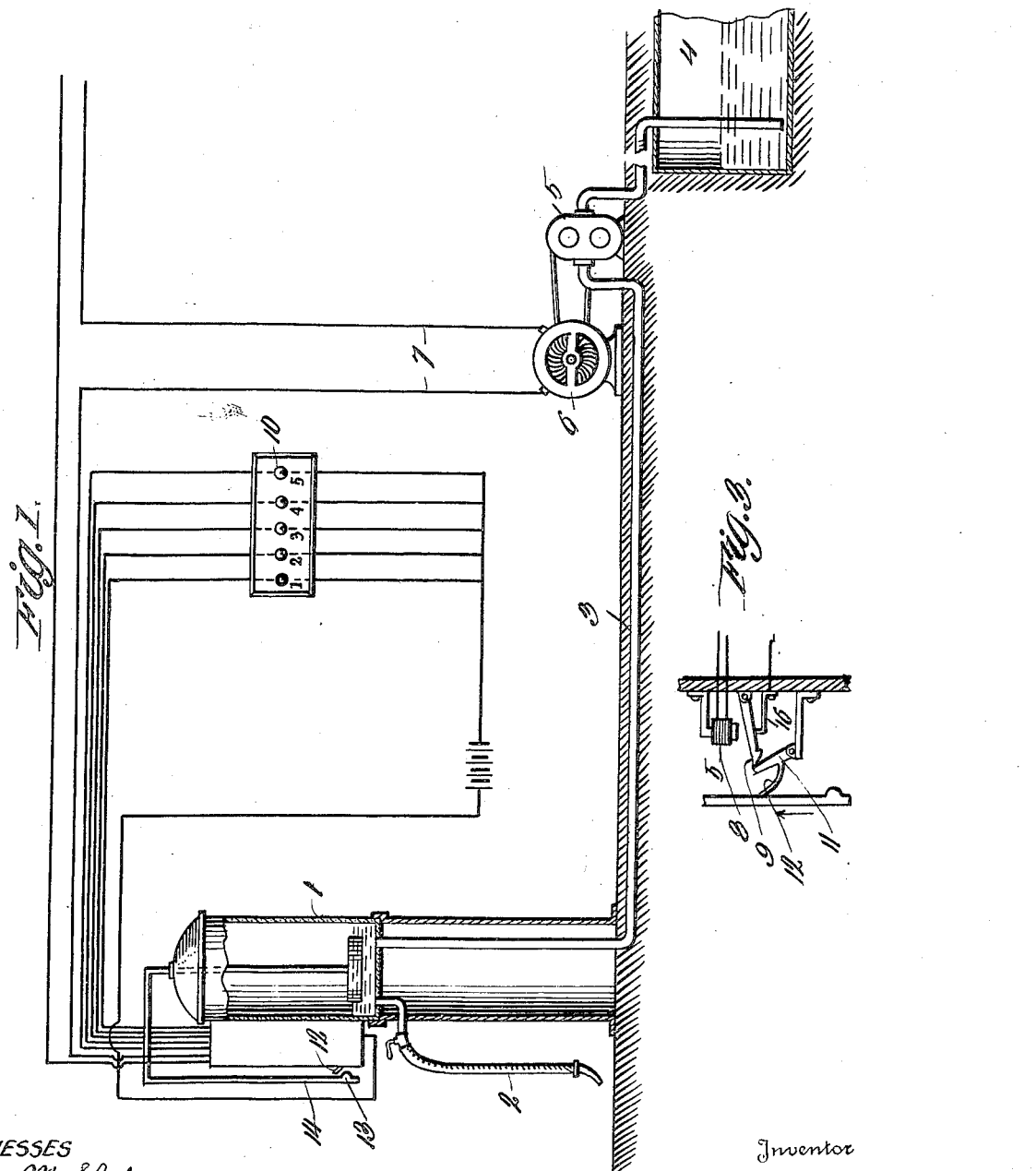

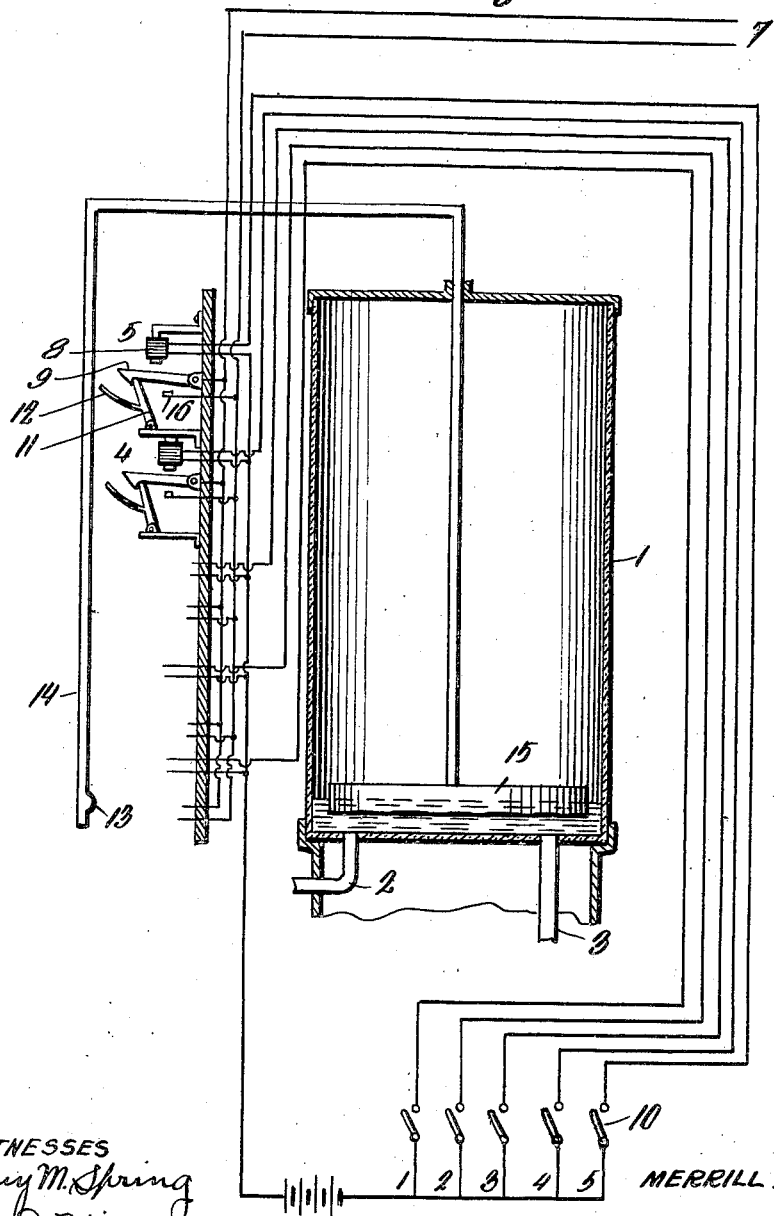

1,434,670

UNITED STATES PATENT OFFICE.

MERRILL A. BEACH, OF PENN YAN, NEW YORK.

AUTOMATIC LIQUID-DISPENSING APPARATUS.

Application filed October 25, 1919. Serial No. 333,296.

*To all whom it may concern:*

Be it known that I, MERRILL A. BEACH, a citizen of the United States, residing at Penn Yan, in the county of Yates and State of New York, have invented certain new and useful Improvements in Automatic Liquid-Dispensing Apparatus, of which the following is a specification.

The invention provides mechanism which admits of liquid being automatically dispensed in determinate quantity from a distant point thereby saving labor, time and trouble.

The invention is primarily designed for dispensing gasoline, oil and like commodity and aims to protect both the dealer and the consumer besides facilitating the service and being otherwise mutually beneficial as the dealer is not required to actually visit the dispensing mechanism and may operate the same from any convenient point day or night.

The mechanism is essentially electrically operated and will accurately dispense the required amount which is visible before acceptance thereof by the purchaser.

The mechanism embodies a measuring chamber, a float therein, controllable by the rise and fall of the liquid therein, a pump for drawing the liquid from a source of supply and delivering it into the measuring chamber, a motor for operating the pump, indicating mechanism for designating the quantity of liquid to be dispensed at each operation, starting mechanism actuated by the indicating mechanism to set the motor in operation, and stopping mechanism actuated by the float in the measuring chamber to throw the motor out of action the instant the measuring chamber has received the predetermined amount of liquid to be dispensed.

The accompanying drawings illustrate an adaptation of the invention and on reference thereto, Figure 1 is a sectional view of the measuring chamber and reservoir containing the liquid in bulk illustrating the operating means in diagram, Figure 2 is a sectional view of the measuring chamber on a larger scale illustrating the co-operating mechanism in diagram, Figure 3 is a detail view of one of the indicating members and circuit closing means in co-operative relation therewith.

Corresponding and like parts are referred to in the following description and indicated in the several views of the drawings by like reference characters.

The numeral 1 designates a measuring chamber for holding any determinate quantity of liquid to be dispensed at one operation. The measuring chamber may be of any construction and supported in any way. An essential feature of the measuring chamber is to admit of the contents thereof being observed so that the purchaser may be assured of receiving full measure. The body of the chamber may be transparent or the same may be constructed in any way so that the level of the liquid therein may be readily observed or ascertained. A delivery tube 2 connects with the bottom of the measuring chamber and is used by the consumer in directing the liquid into the tank or other receptacle placed to receive the liquid when drawing the same from the measuring chamber. A supply pipe 3 connects the measuring chamber with a source of supply 4 which may consist of a tank or other form of reservoir containing the liquid in bulk. A pump 5 of any type is located in the length of the supply pipe 3 and its function is to draw the liquid from the supply 4 and deliver the same into the measuring chamber 1. A motor 6 is in co-operative relation with the pump 5 for operating the latter. The motor 6 may be of any type which may be readily started and stopped by controlling means distant therefrom. The preferred form of motor is of the electric type which admits of the current being supplied thereto and cut off therefrom by controlling means of the push button and switch type. The electric motor 6 is included in a circuit represented by the leads 7 and including a plurality of circuit closing and circuit breaking members.

The measuring chamber 1 may be of a capacity to contain a given number of units of measure according to the nature of the liquid to be dispensed. In this connection it is observed that the measuring chamber may dispense an amount equal to its full capacity at one operation, or may dispense any lesser amount according to the predetermined arrangement of the parts. For the sake of illustration it is assumed that the measuring chamber 1 is of a capacity to contain five gallons of gasoline and is adapted to dispense at one operation the full capacity or any number of gallons from one to five. When the mechanism is adapted for dispensing lubricating oil the units of measure will be in multiples of pints so that one or any number of pints up to the full capacity of the measuring chamber may be dispensed at one operation. Suitable indicating means are provided for each unit of measure of the measuring chamber. These indicating means are substantially duplicate in construction, arrangement and manner of operation and a detail description of one will suffice for a clear understanding thereof. It should be stated however that the indicating means are disposed in vertical series approximating the different levels of the units of measure of the measuring chamber. The indicating means corresponding to the full capacity of the measuring chamber which in the present instance is five gallons, occupies the highest point in the order of arrangement. The indicating means corresponding to the level of a single unit of measure of the measuring chamber occupies the lowermost position in the order of arrangement of the indicating means. The remaining indicating means are located at proper levels as will be readily understood on reference to Fig. 2 of the drawings. Each of the indicating means comprises an electromagnet 8 and a cooperating armature 9. The electromagnet 8 is included in an electric circuit which is controlled by means of a switch 10. When the switch 10 is closed the circuit including the electromagnet 8 is completed thereby energizing the electromagnet which attracts the armature 9 in a manner well understood. A pivoted member 11 is normally held in upright position by means of the armature 9 and when the armature 9 is attracted the member 11 is released and falls forwardly and is utilized as means to indicate the quantity of liquid to be dispensed. The member 11 is provided with an arm 12 which is projected into the path of a trip 13 carried by a rod 14 which is connected to a float 15 disposed within the measuring chamber 1 and controlled in its vertical movements by the change of level of the liquid therein. The armature 9 constitutes one terminal of the motor circuit 7. A contact 16 constitutes the other terminal of the motor circuit. Under normal conditions the motor circuit is held open by the member 9 being supported in elevated position by the member 11. When the switch 10 closes the indicating circuit the member 9 is attracted thereby permitting the member 11 to fall and when the switch 10 previously closed is opened the member 9 attracted by the electromagnet is released and falls and not receiving the support of the member 11 engages the contact 16 thereby closing the motor circuit and starting the motor which operates the pump 5 whereby the liquid is drawn from a source of supply and delivered into the measuring chamber. As the liquid rises in the measuring chamber the float 15 is buoyed upward and carries the member 14 and when the trip 13 reaches the arm 12 the latter is moved upward and lifts the member 9 thereby breaking the motor circuit with the result that the motor stops and the pump 5 ceases to operate. This takes place when the level of the liquid in the measuring chamber corresponds with the quantity of liquid to be dispensed. The operation will be precisely the same whether the quantity to be dispensed consists of one or any number of units up to and including the full capacity of the measuring chamber. The consumer or purchaser may ascertain by observation the level of the liquid in the measuring chamber and draws off the liquid therefrom by means of the delivery tube 2 the end of which is provided with a suitable nozzle to be introduced into the tank or receptacle for receiving the liquid as it is drawn from the measuring chamber. The delivery or dispensing tube 2 is provided in its length with a suitable valve which is normally closed except when the liquid is being drawn from the measuring chamber into the receptacle to be supplied.

It should be stated that there are as many switches 10 as there are indicating means and units of measure contained in the measuring chamber. These switches 10 are numbered to correspond with the units of measure and the indicating means may be correspondingly numbered. As shown in Figs. 1 and 2 the switches are numbered from 1 to 5 and the indicating means are correspondingly numbered. If it be required to dispense a single unit of measure as one gallon, one pint, or other unit of measure the switch numbered 1 is closed thereby closing indicating circuit 1. This will result in closing the motor circuit and causing the pump to supply liquid to the measuring chamber. When the measuring chamber receives the unit of measure the float 15 will have moved upward a distance to cause the trip 13 to break the motor circuit and thereby prevent any greater quantity than the unit of measure being supplied to the measuring chamber. When the amount is withdrawn from the measuring chamber the same is in condition for dispensing the next amount required.

It will be understood from the foregoing that the dispensing mechanism may be located at any desired point and the operating switches 10 may be disposed at any convenient point distant therefrom. The dispensing mechanism is usually located out doors for the convenience of supplying motor fluids such as gasoline and lubricating oils to operators of motor vehicles. In accordance with the present invention the dealer is not required to leave his place of business or residence in order to supply the needs of motorists. This is of material advantage since the dealer may receive the customer at his place of business or residence and operate the dispensing mechanism so as to supply the kind and quantity of fluid required. In the event of a doubt arising as to the quantity the amount contained in the measuring chamber may be ascertained by observation and also by the indicating member 11 which has been released it being understood that the member 11 will be provided with a number corresponding to the units of measure to be dispensed. Any doubt thus arising may be quickly settled. Should a motorist require a supply of fuel or lubricant at night or after the close of business hours the same may be obtained without requiring the dealer to leave his home because all that is necessary to dispense the commodity desired is to manipulate one of the controlling switches or circuit closing means 10.

Having thus fully described my invention what I claim as new and desire to secure by Letters Patent, is:—

1. A fluid dispensing mechanism of the character specified comprising a measuring chamber, a float therein, a pump for supplying the measuring chamber, a motor for operating the pump, starting means for the motor, a plurality of indicating means, each adapted to actuate the motor starting means and included in an independent electric circuit embodying a circuit closure, and a trip connected with the said float and operated thereby for actuating the said starting means to effect a stopping of the motor when the predetermined amount of fluid has been supplied to the measuring chamber.

2. Fluid dispensing mechanism, comprising a measuring chamber, a dispensing tube connected with the measuring chamber for drawing off the fluid therefrom, a float in the measuring chamber, a pump for supplying the measuring chamber, a motor circuit, a motor for operating the pump, starting means for the motor, a plurality of indicating means adjacent the measuring chamber, each adapted to actuate the motor starting means and included in said motor circuit, means remote from the measuring chamber for selectively operating the indicating means, and a trip movable with the said float for actuating the said starting means to stop the motor and effect a cutoff of the supply of fluid to the measuring chamber when the predetermined amount has been supplied thereto.

3. In dispensing mechanism of the character specified, a measuring chamber, a float therein, a pump for supplying the measuring chamber, a motor for the pump, an electric circuit for the pump, a plurality of circuit closures in the pump operating circuit adjacent the measuring chamber, displaceable means normally holding the said circuit closures open, a plurality of electrically operated means for effecting a release of the said displaceable means to admit of the pump circuit closing, each included in an independent circuit containing a selective circuit closure, the selective circuit closures being disposed in a group at a distance from the measuring chamber and a trip connected with said float and actuated thereby for resetting the previously released displaceable member, thereby breaking the pump operating circuit to stop the pump when the required amount of fluid has been supplied to the measuring chamber.

4. In dispensing mechanism of the character specified, a measuring chamber, means for supplying fluid thereto, including a motor driven pump, electrically operated indicating means, a motor for said pump included in a circuit which is normally held open, a displaceable member normally holding the motor circuit open and adapted to be released when the said indicating means are operated, and a trip controlled by the fluid supplied to the measuring chamber for restoring the displaceable member and breaking the motor circuit when the predetermined amount of fluid has been supplied to the measuring chamber.

5. A fluid dispensing mechanism comprising a measuring chamber, a float therein, a pump for supplying fluid to the measuring chamber a motor circuit, a motor for driving the pump and included in said circuit, a plurality of electrically operated circuit closures associated with the measuring chamber and shunted in said motor circuit, means for selectively operating the circuit closures, a displaceable member for each of the circuit closures to normally hold the same open, and a trip connected with the said float and movable therewith for restoring the displaceable member to normal position and breaking the motor circuit which was previously closed by the release of said displaceable member.

6. A fluid dispensing mechanism comprising a measuring chamber, a float therein, a pump for supplying fluid to the measuring chamber, a motor circuit, a motor for driving the pump and included in said circuit, a plurality of circuit closers associated with the measuring chamber and shunted in said circuit, means for normally retaining said circuit closers open, a magnet for each circuit closer, a separate circuit for each magnet whereby the same may be energized to permit said means disengaging its respective circuit closer and for starting the pump, and means carried by said float and adapted to engage said first named means and cause its engagement with said circuit closer for breaking the motor circuit when the predetermined amount of liquid has been delivered to said chamber.

In testimony whereof I affix my signature in presence of two witnesses.

MERRILL A. BEACH.

Witnesses:
JOHN GAVIN,
LEO H. EXCELL.